May 15, 1934.   C. S. BRAGG ET AL   1,958,415
BRAKE SYSTEM FOR AUTOMOTIVE VEHICLES
Original Filed Feb. 10, 1930   3 Sheets-Sheet 1
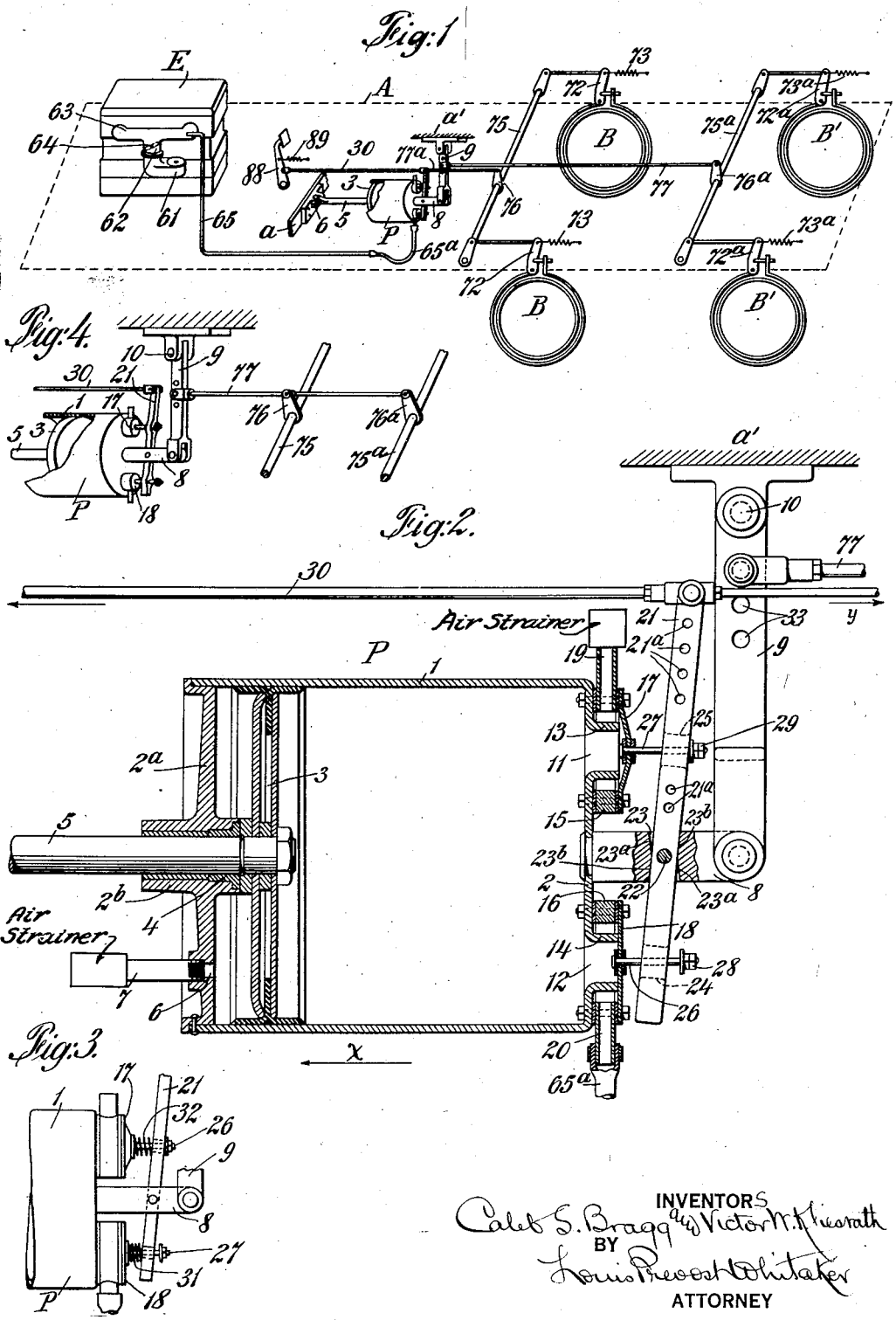

May 15, 1934.　　C. S. BRAGG ET AL　　1,958,415
BRAKE SYSTEM FOR AUTOMOTIVE VEHICLES
Original Filed Feb. 10, 1930　　3 Sheets-Sheet 2
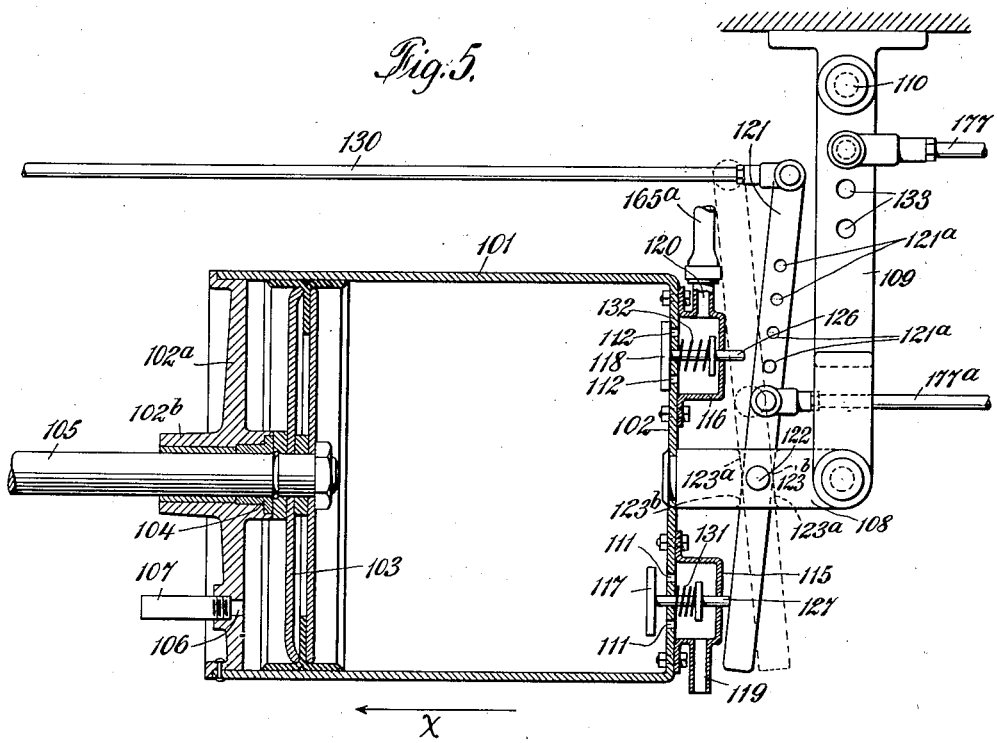
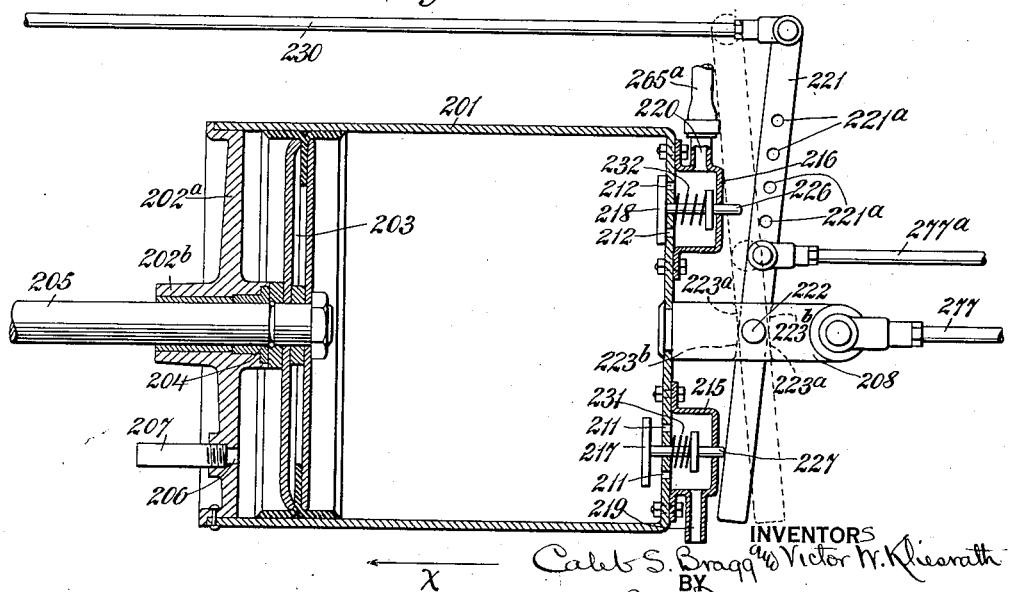
INVENTORS
Caleb S. Bragg and Victor W. Kliesrath
BY
Louis Prevost Whitaker
ATTORNEY

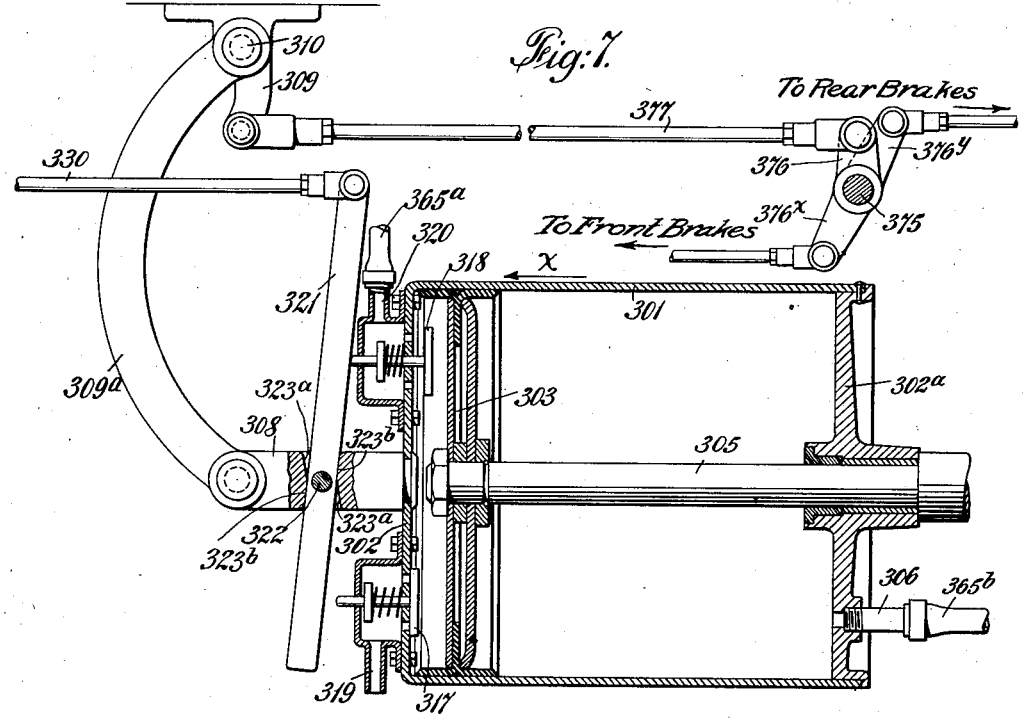
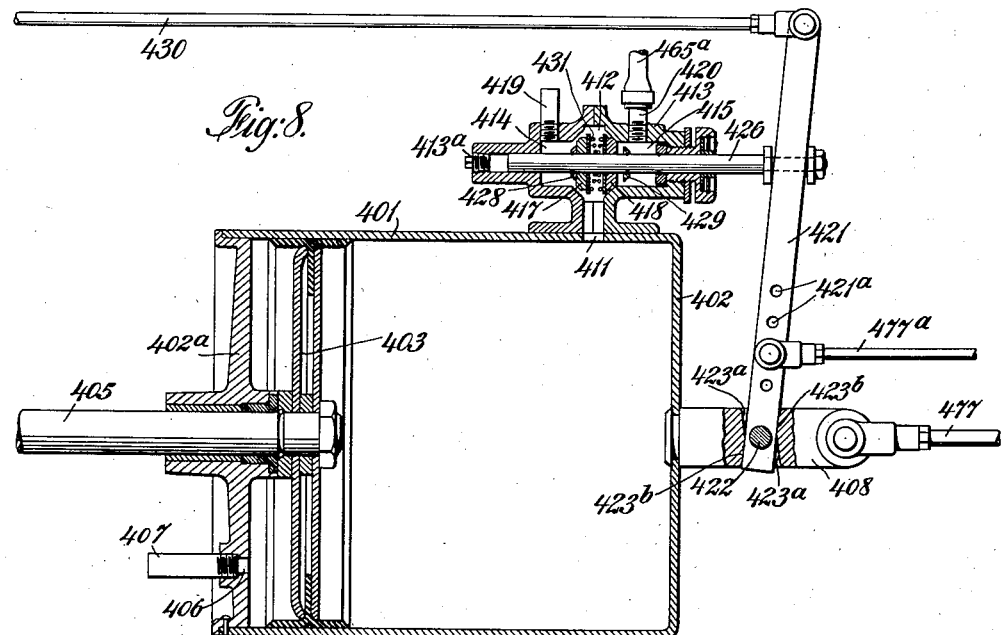

Patented May 15, 1934

1,958,415

UNITED STATES PATENT OFFICE 1,958,415

BRAKE SYSTEM FOR AUTOMOTIVE VEHICLES

Caleb S. Bragg, Palm Beach, Fla., and Victor W. Kliesrath, South Bend, Ind., assignors to Bragg-Kliesrath Corporation, Long Island City, N. Y., a corporation of New York Application February 10, 1930, Serial No. 427,263
Renewed August 7, 1933

18 Claims. (Cl. 188—152)

Our invention consists in the novel features hereinafter described, reference being had to the accompanying drawings which show several embodiments of the invention selected by us for purposes of illustration, and the said invention is fully disclosed in the following description and claims.

The object of our invention is to provide a vacuum brake system for automotive vehicles of novel construction, and which is extremely simple and cheap to manufacture. One feature of the invention is that the controlling valve mechanism for the actuator is carried by a movable member of a vacuum power actuator, preferably the cylinder thereof, and is operated by a lever pivotally mounted on said movable actuator member and movable with and with respect thereto, and connected with a physically operable controlling part, means being provided for applying a reactionary force to the physically operable part substantially proportionate to the force exerted by the actuator upon the brake mechanism, either mechanically or through a part subjected to differentials of fluid pressures, or both. Means are also provided for limiting the relative movement between said lever and the movable actuator member, to enable the operator to further apply the brake mechanism connected with the actuator by physical force, or to apply the same by physical force alone in case of failure of power. A feature of our present invention is that a reactionary force resisting the movement of the physically operable part may be obtained mechanically by a connection from the said physically operable part with a brake mechanism not otherwise operated by the movable actuator member, or may be obtained by connection from said valve operating lever to a brake mechanism to be operated jointly by said physically operable part and said movable actuator member, said brake mechanism constituting only a part of the brake mechanisms operated thereby.

Another feature of this invention is that the same power actuator may be used with the piston submerged in atmosphere or the piston submerged in vacuum without any changes in the power actuator other than its connections with the source of higher and lower pressure.

Referring to the accompanying drawings which illustrate several embodiments of the invention selected by us for purposes of illustration, Fig. 1 is a diagrammatic view of a brake system for automotive vehicles embodying our present invention.

Fig. 2 is an enlarged detail view partly in section, of a portion of the apparatus shown in Fig. 1.

Fig. 3 is a detail view partly broken away, of a portion of the apparatus shown in Fig. 2, illustrating a slight modification.

Fig. 4 is a detail view of a part of the apparatus shown in Fig. 1, illustrating a slight modification in the connections between the brake mechanisms and the actuator.

Fig. 5 is a view similar to Fig. 2, showing the movable actuator member provided with a different form of valve mechanism.

Fig. 6 is a view similar to Fig. 5, showing a modified arrangement for connecting the movable actuator member with the brake mechanism directly connected therewith.

Fig. 7 is a view similar to Fig. 2, showing the same power actuator in which the piston is vacuum-balanced in the retracted position, and slightly modified means for connecting the movable actuator member with the brake mechanism operated thereby.

Fig. 8 is a view similar to Fig. 6, showing a movable actuator member provided with a different type of valve mechanism.

In Fig. 1, we have shown diagrammatically an automotive vehicle, indicated by the dotted lines at A, provided with an internal combustion engine, indicated at E, for propelling the same, and equipped with brake mechanisms for a plurality of wheels of the vehicle, indicated at B, B, and B¹, B¹. It will be understood that the brake mechanisms here diagrammatically shown as being of the drum and brake band type, for illustrative purposes, may be of any desired form and operated in any desired manner, and upon any wheels of the vehicle, but in the present instance we have shown the brakes, B, B, having their actuating levers, 72, 72, operatively connected with a rock shaft, 75, for joint operation and restored to released position by the usual springs, 73, the brake mechanisms, B¹, B¹, having their actuating levers, 73ª, similarly connected to a rock shaft, 75ª, said brake mechanisms being returned to released position by the usual springs, indicated at 73ª. The engine, E, is provided with the usual carburetor, 61, and suction passage comprising the vertical portion, 62, provided with the usual throttle valve, 64, and the usual intake manifold, 63, and the vacuum for operating the power actuator is conveniently obtained by a suction pipe, 65, connected to the intake manifold, 63, between the throttle valve and the engine cylinders. P represents a power actuator shown enlarged and in section in Fig. 2, and comprising a cylinder, 1, which is preferably of drawn wrought metal, having an integral head, 2, the opposite end of the cylinder being provided with a separately formed head, 2ª, provided with a guiding sleeve, 2ᵇ, to receive the piston rod, 5, of the piston, 3, said sleeve being provided with suitable sealing means, indicated at 4, engaging the piston rod. The head, 2ª, of the cylinder is provided with an aperture, 6, which is preferably provided with a tube or nipple, 7. In this instance the piston rod, 5, is shown pivoted at 6, to a stationary part, a, of the chassis, and the cylinder head, 2, is provided with a bracket, 8, pivotally connected with a power applying lever 9, the opposite end of which is pivotally supported at 10, from a portion of the chassis, indicated at a¹. The power actuator is, therefore, supported by the pivotal connection of the piston rod with the chassis, and of the cylinder with the lever, 9, and the cylinder, 1, is the movable member of the actuator.

In the embodiment of our invention shown in Figs. 1 and 2, the cylinder, 1, is shown provided with a very cheap, simple, and effective form of controlling valve mechanism. The head of the cylinder, preferably the integral head, 2, is provided with two apertures, 11 and 12, each surrounded with an annular outwardly projecting valve seat, which seats are indicated at 13 and 14 respectively, and are conveniently formed by drawing out portions of the cylinder head. Surrounding these valve seats are annular spacing rings, indicated at 15 and 16 respectively, having a sealing engagement with the head of the cylinder, and each provided on its outer face with a flexible diaphragm valve, said valves being indicated at 17 and 18 respectively. The diaphragms and spacing plates, provided with suitable sealing rings, are secured to the head of the cylinder in any desired manner, as by bolts and nuts, as shown, and the spacing rings are sufficiently larger than the valve seats to form an annular chamber between them, which communicates with a pipe or nipple, as indicated at 19 and 20 respectively. These pipes or nipples are adapted to receive flexible connecting hose for the connections with the source of suction or with a source of higher fluid pressure, and when, as in most instances where a vacuum is employed, as the low pressure, the atmosphere is the high pressure, the nipples serving as air inlets may be simply left as they are, or may be provided with dust caps in any usual or preferred manner, if desired. By changing the pipe connections as hereinafter explained, a cylinder of this kind can be utilized as part of an actuator in which the piston is pressure-balanced when in retracted position (or in other words, subjected on both faces to the higher fluid pressure), or as part of an actuator in which the piston is vacuum-balanced when in retracted position (or in other words, subjected on both faces to vacuum). In Figs. 1 and 2 the actuator is of the pressure-balanced type.

21 represents the valve actuating lever, which is pivotally mounted on the movable member of the actuator, in this instance being pivoted at 22, in an aperture, 23, extending through the bracket, 8, which is riveted or otherwise secured to the cylinder head, 2. The lever, 21, is provided with apertures, indicated at 24, 25, through which extend loosely valve stems, 26, 27, from the respective diaphragm valves, 18, 17, each valve stem being provided at its outer end with a stop, as indicated at 28, 29, to engage the lever when the latter is moved in a direction to open one or the other of said valves. The lever, 21, is shown in this instance pivotally connected at its upper end with a link rod, 30, the forward end of which is connected to a pedal lever, 88, provided with the usual retracting spring, 89. It is not necessary to provide springs for urging the diaphragms, 17 and 18, toward their respective seats, as the diaphragm which acts as the suction valve, in this instance the diaphragm, 18, will be normally held to its seat by the vacuum in the annular chamber surrounding valve seat, 14, while the air valve, 17, will be drawn firmly upon its seat whenever there is a vacuum within the cylinder forward of the piston. We have, therefore, shown no springs in Fig. 2, but if desired, seating springs may be employed, and in Fig. 3 we have shown coil springs, 31 and 32, surrounding the valve stems and interposed between the valves and the lever, 21. In this instance the nipple, 20, is shown connected by a flexible hose, 65ª, with the suction pipe, 65, and in the normal position of the parts illustrated in Fig. 2 the suction valve, 18, is held upon its seat, and the air inlet valve, 17, is unseated, connecting the cylinder on that side of the piston with the atmosphere through nipple, 19, the cylinder being connected on the other side of the piston with the atmosphere by aperture, 6, and nipple, 7. The nipples, 7 and 19, may be provided with air strainers, if desired.

The movable actuator member is connected with brake mechanism of the vehicle, and in this instance we have shown the lever, 9, provided with several holes, 33, at one of which a link rod, 77, is connected, said link rod extending to an arm, 76ª, in this instance, connected with the rock shaft, 75ª, and brakes, B¹, B¹. In some instances all of the brake mechanisms to be operated by the actuator may be connected to the movable actuator member either directly or through the lever, 9, and in Fig. 4 for example, we have shown the lever, 9, connected by the link rod, 77, both to the rock shaft, 75ª, and to the rock shaft, 75. If the operator desires to apply the brakes, he will depress the pedal lever, 88, moving the rod, 30, and the upper part of the lever, 21, to the left, and the lower part of lever, 21, to the right, thereby permitting the diaphragm, 17, to seat, and thereafter unseating the diaphragm, 18, it being noted that the valve stems are of sufficient length to permit both of the valves, 17 and 18, to be seated at the same time. When the suction valve, 18, is opened, the adjacent portion of the cylinder will begin to be evacuated, and the air pressure on the head, 2, of the cylinder, the piston being held stationary, will move the cylinder in the direction of the arrow, x, in Fig. 2, and will apply the brake mechanism connected with the lever, 9. When the suction valve, 18, is in open position, the differential of fluid pressures on the diaphragm valve, corresponding with those within the cylinder, will tend to close it, and the reactionary effect is thereby transmitted through the lever, 21, to the pedal proportionate to the degree of vacuum in the cylinder, thus enabling the operator to determine accurately the amount of force which is being applied by the actuator to the brake mechanisms. The amount of reactionary force felt by the operator will depend upon the area of the diaphragm valve and the leverage ratio to the pedal, 88, and all force so exerted by the operator to overcome this reactionary force is transmitted to the brakes as the valve acts as a fulcrum point for the lever, 21.

In some instances we prefer to supplement this reactionary force obtained by the differential of fluid pressures on the diaphragm by an actual mechanical reaction, and such a construction is shown in Figs. 1 and 2, in which a part of the brake mechanisms less than the whole number are directly connected to the valve actuating lever, 21. Thus as shown in these figures a link, 77ª, has its forward end pivoted to the lever, 21, at the same point as the pivotal connection of the rod, 30, with said lever, 21, and the rear end of the said link rod, 77ª, is pivotally connected with an arm, 76, on the rock shaft, 75, for operating the brake mechanisms, B, B. It follows from this construction that when the foot pedal is depressed to operate the valve by means of lever, 21, the brake mechanisms, B, B, will be operated directly by the physical force of the operator and the draft of the brake mechanisms, B, B, will react upon the valve actuating lever, 21, with gradually increasing force. This mechanical reaction will be transmitted to the pedal lever through the rod, 30, in addition to any reaction of the suction valve, due to the differential of fluid pressures thereon, as previously described. In some instances, the lever, 21, may be provided with one or more apertures, as indicated at 21ª in Fig. 2, so that the rod, 77ª, may be connected to the lever, 21, at a point between the point of pivoting of said lever and its connection with the pedal rod, 30, for example as shown in Figs. 5 and 6 and hereinafter described. By this means certain of the brake mechanisms, less than the whole number, may be connected with the valve actuating lever, so that said brake mechanisms will be applied partly by the physical force of the operator and partly by the power of the actuator, the proportions in which these two forces will be applied to said brakes connected with rod, 177ª, as the brakes, B, B, depending upon the point of connection of the rod, 77ª, with the lever, 21. Obviously, in such case the mechanical reaction upon the pedal will be in the same proportion to the entire load of these brakes.

It is to be understood that we may employ both of these reactionary forces, or either of them separately without the other. If it is desired to rely wholly on the reactionary differential of fluid pressures on the suction valve, all of the brake mechanisms to be operated may be connected with the power applying lever, 9, as indicated in Fig. 4, and where it is desired to dispense with the differential of fluid pressures on the suction valve as a reactionary force, it is only necessary to make the valve of such small area that the differential of fluid pressures thereon is negligible. We also provide means for limiting the relative movement between the valve actuating lever, 21, and the movable actuator member, in this instance the cylinder. This can be accomplished in a number of ways. In Fig. 2 for example, we have shown the aperture, 23, in which the valve actuating lever, 21, is mounted in the bracket, 8, provided with arresting faces or shoulders, 23ª, to engage the forward face of lever, 21, above its point of pivoting, and the rear face of said lever below its point of pivoting, and limit the forward movement of the lever, 21, with respect to the cylinder, 1. It will be obvious that when the lever, 21, has been moved far enough in a forward direction to engage said shoulders, the physical force exerted on the pedal will be applied directly to the cylinder, and through the link rods, 77 and 77ª, to the brake mechanisms, thus permitting the operator to add his physical force to that of the actuator when desired, and also to operate all the brake mechanisms in case of failure of power. In the latter case, the forward movement of the lever, 21, will have permitted the air inlet valve, 17, to close, and will have opened the suction valve, so as to vent the cylinder through the suction pipe, 65, to the intake manifold, and thence to the atmosphere if the engine is not running. When the parts return to released position, the valve actuating lever, 21, engages the oppositely disposed shoulders, 23ᵇ (see Fig. 2), which limit the return movement of lever, 21, and prevent injury to the valves, which might otherwise occur, as the pedal moves rearwardly under the action of its retracting spring, 89.

It will be seen that in the construction shown in Figs. 1 and 2, when the pedal is depressed to effect a power stroke of the actuator, the upper end of lever, 21, will be drawn forward with respect to its point of pivoting, and the forward movement of the pedal will be resisted by the differential of fluid pressures on the suction valve, 18, and also by the draft of the brake mechanisms, B, B, so that the operator will be obliged to exert a continuously increasing amount of force on the pedal to keep the valves in position to continue the operation of the actuator. As the cylinder, 1, moves forward in the direction of the arrow, $x$, Fig. 2, the power of the actuator will be applied to the brake mechanisms, B¹, B¹, through the lever, 9, and rod, 77, while the brakes, B, B, will be applied entirely by the physical force of the operator, as before stated. The load of the brakes, B, B, will exert an increasing reactionary pull on the pedal in the direction of the arrow, $y$, in Fig. 2. The forward movement of the pedal continues as the brakes are applied, and if the operator stops the forward movement of his foot and the pedal at any intermediate point in the stroke of the pedal, the continued movement of the cylinder, 1, in the direction of the arrow, $x$, will carry the pivotal point, 22, of the lever, 21, forwardly with respect to the upper end of said lever and close the suction valve, 18, which will arrest the actuator and hold the brakes as applied. All the brake mechanisms can, therefore, be applied gradually and held as applied to any desired extent, the brakes, B, B, being applied by physical force alone in the construction shown in Figs. 1 and 2, while the brakes, B¹, B¹, will be applied by power up to the maximum power of the actuator. A further forward movement of the pedal will enable the operator to apply additional physical force beyond that required to overcome the reactionary force of the valve, 18, and the mechanical reaction from the brakes, B, B, which additional physical force will further apply both the brakes, B, B, and the brakes, B¹, B¹. Where as in Figs. 5 and 6 the link rod corresponding with the link, 77ª, is connected to the valve actuating lever at a point nearer its pivot than is the pedal rod, so that only a portion of the power required to apply the brakes, B, B, reacts on the pedal lever, the brakes, B, B, will be applied by both the physical force of the operator and the power of the actuator, while the brakes, B¹, B¹, will be applied by power only until the power actuator is exerting its maximum force, after which the further depression of the pedal will add additional physical force to both sets of brake mechanisms.

To release the brakes, it is only necessary to release the pedal lever, 88, which will be retracted not only by its spring, 89, but by the reactionary force or forces previously mentioned, returning the lever, 21, to its normal position in contact with shoulders, 23ᵇ, and opening the air inlet valve, 17, after permitting the suction valve, 18, to close. Air will then enter the cylinder, equalizing pressures on opposite faces of the cylinder head, and permitting the brakes to instantly release themselves and return, together with the piston, to released position under the action of their usual retracting springs, indicated at 73 and 73ᵃ.

In Fig. 5, we have shown a slightly modified form of valve mechanism in a construction similar to that shown in Fig. 2, the parts corresponding to those shown in Fig. 2 being given the same reference numerals with the addition of 100. In this figure, the head, 102, of the cylinder, 101, is provided with a pair of poppet valves, 117 and 118, for closing apertures, 111 and 112 respectively. The valve stems, 126 and 127, extend into valve casings, 115 and 116, provided with nipples, 119 and 120 respectively, and the valve stems are provided with springs, 131 and 132, normally tending to seat the valves. The outer ends of the valve stems extend into a position to be operated by the valve actuating lever, 121, which is mounted in the same manner as shown in Fig. 2, and operatively connected by the link, 177ᵃ, at a point between its pivot and its connection with the pedal rod, 130, with part of the brake mechanism, while the power applying lever, 109, is connected by the link, 177, with other of the brake mechanisms. In this instance the valve, 117, at the lower part of the figure, is the air inlet valve, and the valve, 118, is the suction valve, the nipple, 120, being connected by suction pipe, 165ᵃ, in the manner shown in Fig. 1, with the intake manifold. The upper end of lever, 12, is connected by rod, 130, with the pedal in the same manner as previously described. In this construction the forward movement of the upper end of the valve actuating lever, 121, will open the suction valve, 118, after permitting the air inlet valve, 117, to close, and the operation will be exactly like that previously described, except that in this instance the only reactionary force acting on the pedal is the mechanical reaction obtained through the connection of the valve actuating lever by link, 177ᵃ, with a part of the brake mechanisms, as there will be no reactionary effect on the suction valve. The lever, 121, is shown provided with a plurality of apertures, 121ᵃ, for varying the proportions in which the physical force of the operator and the power of the actuator are applied to the brake mechanisms connected with the rod, 177ᵃ.

In Fig. 6, we have shown another slight modification of our invention, in which the parts corresponding with those shown in Fig. 2 are given the same reference numerals with the addition of 200. The construction is exactly like that shown in Fig. 5, except that in this instance the power applying lever is omitted, and the cylinder of the actuator is directly connected with certain of the brake mechanisms and is supported by the pivotal connection of the piston with the chassis, and the linkage which connects the cylinder with the brake mechanisms. This is accomplished by connecting the link rod, 277, directly with the bracket, 208. In both the constructions shown in Figs. 5 and 6, the relative movement between the valve actuating lever and the cylinder may be limited either by shoulders, 123ᵃ, 123ᵇ, or 223ᵃ, 223ᵇ, on the bracket, as in Fig. 2, or by permitting the upper portion of the valve actuating lever to come directly in contact with the casing for the suction valve, as indicated in dotted lines in Figs. 5 and 6.

Either of the forms of power actuator, cylinder and valves shown in Figs. 2, 5 and 6 can be employed in an actuator which is vacuum-balanced, that is, in which both faces of the piston are exposed to vacuum when the parts are in the released position. In Fig. 7 for example, in which the parts corresponding to those shown in Fig. 2 are given the same reference numerals with the addition of 300, we have shown a cylinder constructed exactly like those shown in Figs. 5 and 6, forming part of a vacuum-balanced power actuator. In this instance the cylinder, 301, is turned end for end, the piston, 303, when in released position occupies a position adjacent to the cylinder head, 302, in which the valves are mounted, and the piston rod is pivotally connected with the chassis in rear of the cylinder. The forward end of the cylinder is supported by an arm, 309ᵃ, of a power applying lever pivotally mounted on the chassis and having its lower end connected to the bracket, 308. This power applying lever is provided with an arm, 309, connected by link, 377, with the brake mechanisms to be operated. In this instance the link, 377, is shown connected to an arm, 376, on a rock shaft to which one or more pairs of brake mechanisms may be connected. The shaft, 375, is in this instance provided with arms, 376ˣ and 376ʸ, one each of which is shown for operating the front and rear wheel brakes. In this figure, 318 is a suction valve, which is normally held in open position by the valve actuating lever, 321, the suction pipe from the intake manifold being connected, as indicated at 365ᵃ and 365ᵇ, with the nipple, 320, of the suction valve casing, and with the nipple, 306, communicating with the cylinder on the opposite side of the piston. It will thus be seen that in the released position of the parts as shown in Fig. 7, the cylinder will be evacuated on both sides of the piston, and the piston will be submerged in vacuum. The valve actuating lever, 321, is connected by the link rod, 330, with the pedal in the manner previously described. To apply the brakes, the operator will depress the pedal and move the upper end of lever, 321, forwardly, so as to open the air valve, 317, after permitting the suction valve to close, and admitting air between the cylinder head, 302, and the piston, tending to equalize pressures on the head, 302, and the air pressure on the exterior face of the head, 302ᵃ, (the inner face of which is always subjected to maximum vacuum), will move the cylinder, 301, forwardly in the direction of the arrow, x, Fig. 7, thereby applying the brakes through the lever, 309, 309ᵃ. The operation is the same as that previously described, except that in this type of actuator the stroke is obtained by admitting air to the cylinder on one side of the piston, and the brakes are released by reestablishing a communication between the suction source and said portion of the cylinder to suck out the air previously admitted.

In the construction shown in Fig. 7, no reactionary force operative on the pedal is provided, but the relative movement between the valve actuating lever and the cylinder can be taken up either by the shoulders, 323ᵃ, in the bracket, 308, or by the engagement between the lower end of the lever, 321, and the valve casing for the air inlet valve, so that the operator can apply his physical force to the brake mechanisms through the lever, 309ᵃ, and operate the brakes by physical force alone in case of failure of power.

In Fig. 8, in which the parts corresponding with those shown in Fig. 2 are given the same reference numerals with the addition of 400, we have shown an arrangement similar to that illustrated in Fig. 6, with the exception that a different valve mechanism is employed. In this embodiment of our invention, the cylinder, 401, is provided with a closed head, 402, to which the bracket, 408, is attached, said bracket being connected by the link, 477, with part of the brake mechanisms, in the manner shown in Fig. 1. In this embodiment of the invention, the cylinder, 401, is provided with a single aperture at one side, indicated at 411, communicating with a central valve chamber, 412, in a valve casing, 413, provided with chambers, 414 and 415, on opposite sides of the central valve chamber connected respectively by the nipples, 419 and 420. A single valve actuating part or stem, 426, extends longitudinally through the valve casing, and through oppositely disposed valves, 417 and 418, which are preferably made of compressed and molded cork, cork composition, rubber, or other suitable material, and are pressed toward their seats by springs, 431, located between the valves. The valves sealingly engage the valve stem and are capable of movement with and with respect to said stem. The valve stem is provided with fixed collars, 428 and 429, which are separated from each other a sufficient distance to permit both of the valves to seat simultaneously, while the movement of the valve stem in either direction will open one valve after permitting the other to seat under the influence of the intervening spring. This particular form of valve mechanism forms no part of our present invention, as it is covered by our Letters Patent of the United States, No. 1,731,041 dated October 8, 1929. In this instance the nipple, 420, is shown connected with the suction pipe, 465ª leading to the intake manifold and the valve stem, 426, is connected with the valve actuating lever 421, so that in the released position of the parts, the valve, 418, which is the suction valve, is held seated, and the valve, 417, which is the air inlet valve, is held unseated to connect the adjacent portion of the cylinder, 401, with the atmosphere through nipple, 419. The valve casing, 413, is also shown provided with a screw plug, 413ª, which may conveniently form a stop for limiting the stroke of the valve stem, 426, and assist the shoulders, 423ª, in limiting the relative movement between the valve actuating lever, 421, and the cylinder. The operation of this embodiment of our invention is exactly the same as that previously described, except that when the pedal is depressed, the connecting rod, 430, will draw the upper end of lever, 421, forward to first seat the air inlet valve, 417, and thereafter unseat the suction valve, 418, to connect the cylinder with the manifold, exhaust the air from the cylinder, and effect a power stroke of the cylinder. In this construction the pedal will be subjected to the reactionary force of a portion of the brake mechanism, through the connection of the rod, 477ª, with the valve actuating lever, 421.

The forward movement of the cylinder in the direction of the arrow, x, in Fig. 7 will apply all of the brakes by power so long as the operator continues to move the pedal forwardly. If the operator ceases to move the pedal before the cylinder reaches the limit of its stroke, the upper end of the valve actuating lever, 421, will be arrested, and the continued forward movement of the cylinder will move the valve casing, 413, forwardly with respect to the valve stem, 426, so as to close the suction valve and arrest the movement of the piston, thus holding the brakes as applied, and locking the vacuum in the cylinder in the manner previously described with reference to Figs. 2, 5 and 6. When the full power of the actuator has been exerted, the operator can add further physical force beyond that required to overcome the reactionary force of the brakes connected with rod, 477ª, to the cylinder, 401, and to all of the brake mechanisms, and in like manner can apply all of the brake mechanisms by physical force alone in case of failure of power. When the operator releases the pedal, the retracting spring thereof, as shown in Fig. 1, will move the connecting rod, 430, rearwardly, so as to close the suction valve, 418, and open the air inlet valve, 417, equalizing pressures in the cylinder and permitting it and the brakes to return to their released positions under the action of their usual brake retracting springs.

The disclosure of Figures 5 and 7 is also disclosed and is specifically claimed in our copending application Serial No. 710,074, filed February 7, 1934. The structure of the valves disclosed in said figures and the valve operation and also generic claims not limited to require a floating cylinder or to require that the valve actuating lever be supported by the floating member of the actuator are also included in said copending application.

What we claim and desire to secure by Letters Patent is:—

1. In a brake system for automotive vehicles, the combination with a power actuator having relatively movable members of means for connecting said actuator with sources of high and low pressures, brake mechanism operatively connected with a movable actuator member, a physically operable control member, controlling mechanism included as a part of said first mentioned means and carried by said movable actuator member together with a valve operating lever pivotally connected intermediate its ends with said movable actuator member and movable with and with respect thereto, and a connection from said lever to said physically operable part at a point at a distance from its pivotal connection with said actuator member for moving said lever to effect a power stroke of the actuator, in the same direction that it is moved by said actuator member during a power stroke thereof, and means for connecting said lever to brake mechanism not otherwise connected with said movable actuator member, extending in a direction to resist the movement of the physically operable part.

2. In a brake system for automotive vehicles, the combination with a power actuator comprising a cylinder movable with respect to the chassis of the vehicle, and a piston connected with and supported by the chassis, controlling valve mechanism for the actuator carried by said cylinder, connections from the cylinder to brake mechanism of the vehicle, a valve actuating lever pivotally connected with and supported by the cylinder, a physically operable part, and connections between it and said valve actuating lever.

3. In a brake system for automotive vehicles, the combination with a power actuator comprising a cylinder movable with respect to the chassis of the vehicle, and a piston connected with and supported by the chassis, controlling valve mechanism for the actuator carried by said cylinder, connections from the cylinder to brake mechanism of the vehicle, a valve actuating lever pivotally connected with and supported by the cylinder, a physically operable part, and connections between it and said valve actuating lever, and means for connecting said valve actuating lever with brake mechanisms of the vehicle not otherwise connected with said cylinder to apply reactionary force to said physically operable part when moved in a direction to produce a stroke of the actuator.

4. In a brake system for automotive vehicles, the combination with a power actuator comprising a cylinder movable with respect to the chassis of the vehicle, and a piston connected with and supported by the chassis, controlling valve mechanism for the actuator carried by said cylinder, connections from the cylinder to brake mechanism of the vehicle, a valve actuating lever pivotally connected with and supported by the cylinder, a physically operable part, and connections between it and said valve actuating lever, and means for connecting said valve actuating lever with brake mechanisms of the vehicle not otherwise connected with said cylinder to apply reactionary force to said physically operable part when moved in a direction to produce a stroke of the actuator, and means for limiting the relative movement between said valve actuating lever and the cylinder.

5. In a brake system for automotive vehicles, the combination with a power actuator comprising a cylinder movable with respect to the chassis of the vehicle, and a piston connected with and supported by the chassis, controlling valve mechanism for the actuator carried by said cylinder, connections from the cylinder to brake mechanism of the vehicle, a valve actuating lever pivotally connected with and supported by the cylinder, a physically operable part, and connections between it and said valve actuating lever, and a connection from said valve actuating lever between its point of pivoting and its point of connection with the physically operable part, and extending to brake mechanism not otherwise connected to the cylinder, for applying reactionary force to the physically operable part when moved in a direction to effect a power stroke of the actuator.

6. In a brake system for automotive vehicles, the combination with a power actuator comprising a cylinder movable with respect to the chassis of the vehicle, and a piston connected with and supported by the chassis, controlling valve mechanism for the actuator carried by said cylinder, connections from the cylinder to brake mechanism of the vehicle, a valve actuating lever pivotally connected with and supported by the cylinder, a physically operable part, and connections between it and said valve actuating lever, and a link rod pivotally connected to said valve actuating lever between its pivotal connection with the cylinder and its connection with the physically operable part, said link extending to brake mechanism not otherwise connected with the cylinder, the point of connection of said link with said lever being located nearer to the pivotal connection of the lever with the cylinder than to its connection with the physically operable part to apply reactionary force to said physically operable part at a reduced leverage.

7. In a brake system for automotive vehicles, the combination with a power actuator comprising a cylinder movable with respect to the chassis, and a piston connected with a part fixed with respect to the chassis, connections from a head of the cylinder extending to brake mechanisms of the vehicle and co-operating with said fixed part of the chassis in supporting said actuator, inlet and suction ports located in said cylinder head, inlet and suction valves for closing said ports and having projecting valve stems, a valve actuating lever pivotally connected with and supported by the cylinder and operatively connected with said valve stems, a physically operable part, and connections therefrom to said valve actuating lever.

8. In a brake system for automotive vehicles, the combination with a power actuator comprising a cylinder movable with respect to the chassis, and a piston connected with a part fixed with respect to the chassis, connections from a head of the cylinder extending to brake mechanisms of the vehicle and co-operating with said fixed part of the chassis in supporting said actuator, inlet and suction ports located in said cylinder head, inlet and suction valves for closing said ports and having projecting valve stems, a valve actuating lever pivotally connected with and supported by the cylinder and operatively connected with said valve stems, a physically operable part, and connections therefrom to said valve actuating lever, and means for connecting said valve actuating lever with brake mechanisms of the vehicle not otherwise connected with said cylinder to apply reactionary force to said physically operable part when moved in a direction to effect a power stroke of the cylinder.

9. In a brake system for automotive vehicles, the combination with a power actuator comprising a cylinder movable with respect to the chassis, and a piston connected with a part fixed with respect to the chassis, connections from a head of the cylinder extending to brake mechanisms of the vehicle and co-operating with said fixed part of the chassis in supporting said actuator, inlet and suction ports located in said cylinder head, inlet and suction valves for closing said ports and having projecting valve stems, a valve actuating lever pivotally connected with and supported by the cylinder and operatively connected with said valve stems, a physically operable part, and connections therefrom to said valve actuating lever, said suction valve when moved by said lever to open position being subjected to a differential of fluid pressures corresponding with that to which the power actuator is subjected, and applying through said valve actuating lever a reactionary force to the physically operable part.

10. In a brake system for automotive vehicles, the combination with a power actuator comprising a cylinder movable with respect to the chassis, and a piston connected with a part fixed with respect to the chassis, connections from a head of the cylinder extending to brake mechanisms of the vehicle and co-operating with said fixed part of the chassis in supporting said actuator, inlet and suction ports located in said cylinder head, inlet and suction valves for closing said ports and having projecting valve stems, a valve actuating lever pivotally connected with and supported by the cylinder and operatively connected with said valve stems, a physically operable part, and connections therefrom to said valve actuating lever, said suction valve when moved by said lever to open position being subjected to a differential of fluid pressures corresponding with that to which the power actuator is subjected, and applying through said valve actuating lever a reactionary force to the physically operable part, and means for connecting said valve actuating lever with brake mechanisms not otherwise connected with the actuator for applying additional reactionary force to said physically operable part.

11. In a brake system for automotive vehicles, the combination with a power actuator comprising a cylinder movable with respect to the chassis and a piston connected with a fixed part of the chassis, a power applying lever connected with the cylinder and with a fixed part of the chassis, controlling valve mechanism for the power actuator carried by the cylinder, a valve actuating lever pivotally connected with and supported by the cylinder, a physically operable part, connections therefrom to the valve actuating lever, brake mechanisms for the vehicle, and connections from said power applying lever to said brake mechanisms.

12. In a brake system for automotive vehicles, the combination with a power actuator comprising a cylinder movable with respect to the chassis and a piston connected with a fixed part of the chassis, a power applying lever connected with the cylinder and with a fixed part of the chassis, controlling valve mechanism for the power actuator carried by the cylinder, a valve actuating lever pivotally connected with and supported by the cylinder, a physically operable part, connections therefrom to the valve actuating lever, connections from said valve actuating lever to certain of said brake mechanisms less than the whole number for applying reactionary force to said physically operable part when moved in a direction to effect a power stroke of the actuator, and connections from said power applying lever to other of said brake mechanisms.

13. In a brake system for automotive vehicles, the combination with a power actuator comprising a cylinder movable with respect to the chassis and a piston connected with a fixed part of the chassis, a power applying lever connected with the cylinder and with a fixed part of the chassis, controlling valve mechanism for the power actuator carried by the cylinder, a valve actuating lever pivotally connected with and supported by the cylinder, a physically operable part, connections therefrom to the valve actuating lever, brake mechanisms for the vehicle, connections from said power applying lever to said brake mechanisms, said valve mechanism having a part subjected to differentials of fluid pressures corresponding to those to which the actuator is subjected during a power stroke of the same, said differentials of fluid pressures being applied through the valve actuating lever to said physically operable part in a direction to resist the movement thereof to effect a continuing power stroke of the actuator.

14. In a brake system for automotive vehicles, the combination with a power actuator comprising a cylinder movable with respect to the chassis, and having a closed head provided with inlet and suction ports and valve seats surrounding the same on the exterior of the cylinder head, said cylinder having a piston therein connected with a fixed part of the chassis, a valve casing extending around each of said valve seats, a diaphragm valve sealingly secured to each of said casings and adapted to engage the adjacent valve seat, means for connecting one of said valve casings with a source of suction and the other with a source of higher fluid pressure, means for connecting said cylinder with brake mechanism of the vehicle, a valve actuating lever pivotally connected with and supported by said cylinder, and operatively connected with said diaphragm valves by means permitting both valves to be seated simultaneously and one of said valves to be opened after the other closes by a movement of said lever in either direction, a physically operable part, and connections therefrom to said valve actuating lever.

15. In a brake system for automotive vehicles, the combination with a power actuator comprising a cylinder movable with respect to the chassis, and having a closed head provided with inlet and suction ports and valve seats surrounding the same on the exterior of the cylinder head, said cylinder having a piston therein connected with a fixed part of the chassis, a valve casing extending around each of said valve seats, a diaphragm valve sealingly secured to each of said casings and adapted to engage the adjacent valve seat, means for connecting one of said valve casings with a source of suction and the other with a source of higher fluid pressure, means for connecting said cylinder with brake mechanism of the vehicle, a valve actuating lever pivotally connected with and supported by said cylinder, and operatively connected with said diaphragm valves by means permitting both valves to be seated simultaneously and one of said valves to be opened after the other closes by a movement of said lever in either direction, a physically operable part, and connections therefrom to said valve actuating lever, said lever when in released position holding the air inlet controlling diaphragm unseated and permitting the suction controlling diaphragm to seat, the suction within portions of the valve casing surrounding said suction valve seat holding the suction controlling diaphragm seated, and said suction controlling diaphragm being subjected in the open position to differentials of fluid pressures corresponding with those to which the power actuator is subjected, said differentials of fluid pressures on said diaphragm being transmitted to the physically operable part in a direction to resist the movement thereof to effect a continuing power stroke of the actuator.

16. In a brake system for automotive vehicles, the combination with a power actuator comprising a cylinder movable with respect to the chassis, and having a closed head provided with inlet and suction ports and valve seats surrounding the same on the exterior of the cylinder head, said cylinder having a piston therein connected with a fixed part of the chassis, a valve casing extending around each of said valve seats, a diaphragm valve sealingly secured to each of said casings and adapted to engage the adjacent valve seat, means for connecting one of said valve casings with a source of suction and the other with a source of higher fluid pressure, means for connecting said cylinder with brake mechanism of the vehicle, a valve actuating lever pivotally connected with and supported by said cylinder, and operatively connected with said diaphragm valves by means permitting both valves to be seated simultaneously and one of said valves to be opened after the other closes by a movement of said lever in either direction, a physically operable part, and connections therefrom to said valve actuating lever, and connections from said valve actuating lever to brake mechanisms of the vehicle not otherwise connected with the power actuator for applying the reactionary force to said physically operable part.

17. In a brake system for automotive vehicles, the combination with a power actuator comprising a cylinder movable with respect to the chassis, and having a closed head provided with air inlet and suction ports and outwardly extending valve seats surrounding said ports, and a piston in said cylinder having a piston rod pivotally connected with a fixed part of the chassis, a power applying lever pivotally connected with said cylinder head and with a fixed part of the chassis, a valve casing surrounding each of said valve seats on the cylinder head, a diaphragm valve sealingly engaging each of said valve casings and adapted to engage the adjacent valve seat, a valve stem connected with each of said diaphragms, means for connecting one of said valve casings with a source of suction and the other with a source of higher fluid pressure, a valve actuating lever pivotally connected with the cylinder and operatively connected with said valve stems so as to permit both of said diaphragm valves to seat simultaneously in one position of the lever, a physically operable part, retracting means therefor, and a connection from said physically operable part to said valve lever for holding it normally in position to unseat the air inlet port controlling diaphragm and permit the suction controlling diaphragm to seat, brake mechanisms for the vehicle and connections therefrom to said cylinder.

18. In a brake system for automotive vehicles, the combination with a power actuator comprising a cylinder movable with respect to the chassis, and having a closed head provided with air inlet and suction ports and outwardly extending valve seats surrounding said ports, and a piston in said cylinder having a piston rod pivotally connected with a fixed part of the chassis, a power applying lever pivotally connected with said cylinder head and with a fixed part of the chassis, a valve casing surrounding each of said valve seats on the cylinder head, a diaphragm valve sealingly engaging each of said valve casings and adapted to engage the adjacent valve seat, a valve stem connected with each of said diaphragms, means for connecting one of said valve casings with a source of suction and the other with a source of higher fluid pressure, a valve actuating lever pivotally connected with the cylinder and operatively connected with said valve stems so as to permit both of said diaphragm valves to seat simultaneously in one position of the lever, a physically operable part, retracting means therefor, a connection from said physically operable part to said valve lever for holding it normally in position to unseat the air inlet port controlling diaphragm and permit the suction controlling diaphragm to seat, brake mechanisms for the vehicle, connections from said valve actuating part to certain of said brake mechanisms less than the whole number for applying a reactionary force to the physically operable part, and connections from said power applying lever to other of said brake mechanisms.

CALEB S. BRAGG.
VICTOR W. KLIESRATH.